United States Patent
Cao

(10) Patent No.: US 9,578,509 B2
(45) Date of Patent: Feb. 21, 2017

(54) NETWORK CONNECTING DEVICE, SYSTEM AND METHOD FOR SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 73 days.

(21) Appl. No.: 14/445,508

(22) Filed: Jul. 29, 2014

(65) Prior Publication Data

US 2015/0040196 A1  Feb. 5, 2015

(30) Foreign Application Priority Data

Jul. 31, 2013 (CN) .................. 2013 1 03289038

(51) Int. Cl.
| | |
|---|---|
| H04W 12/08 | (2009.01) |
| H04M 15/00 | (2006.01) |
| H04L 29/06 | (2006.01) |
| H04W 12/00 | (2009.01) |
| H04W 12/06 | (2009.01) |

(52) U.S. Cl.
CPC ............ H04W 12/08 (2013.01); *H04L 63/08* (2013.01); *H04M 15/93* (2013.01); *H04W 12/00* (2013.01); *H04W 12/06* (2013.01)

(58) Field of Classification Search
CPC ...... H04W 12/08; H04W 12/00; H04W 12/06; H04M 15/93; H04L 12/145; H04L 63/08
See application file for complete search history.

(56) References Cited

U.S. PATENT DOCUMENTS

| | | | | |
|---|---|---|---|---|
| 2003/0182431 A1* | 9/2003 | Sturniolo | ............ | H04L 63/0272 709/227 |
| 2004/0122910 A1* | 6/2004 | Douglass | .......... | G06F 17/30902 709/214 |
| 2007/0143827 A1* | 6/2007 | Nicodemus | ......... | G06F 21/6218 726/2 |
| 2013/0103807 A1* | 4/2013 | Couto | ................... | H04W 12/06 709/220 |
| 2014/0123232 A1* | 5/2014 | Kuscher | ................ | H04W 12/08 726/4 |

* cited by examiner

*Primary Examiner* — Morshed Mehedi
*Assistant Examiner* — Ayoub Alata
(74) *Attorney, Agent, or Firm* — Zhigang Ma

(57) ABSTRACT

A network connecting device communicates with a network providing device and a terminal device. The network providing device can send authorization information for providing a network. The terminal device can send a request for sharing the network. The network connecting device obtains the authorization information sent by the network providing device and the request sent by the terminal device. The network connecting device connects the terminal device to the network provided by the network providing device according to the authorization information. A network connecting system and method are also provided.

3 Claims, 2 Drawing Sheets ature, and is not necessarily limited to", it specifically

NETWORK CONNECTING DEVICE, SYSTEM AND METHOD FOR SAME

CROSS-REFERENCE TO RELATED APPLICATIONS

This application claims priority to Chinese Patent Application No.201310328903.8 filed on Jul. 31, 2013 in China Intellectual Property Office, the contents of which are incorporated by reference herein.

FIELD

The subject matter herein generally relates to wireless network connecting methods.

BACKGROUND

Wi-Fi (Wireless Fidelity) network has been commonly used. Many people may want to share the Wi-Fi network to save network resources.

BRIEF DESCRIPTION OF THE DRAWINGS

Implementations of the present technology will now be described, by way of example only, with reference to the attached figures.

DETAILED DESCRIPTION

Figure 1:
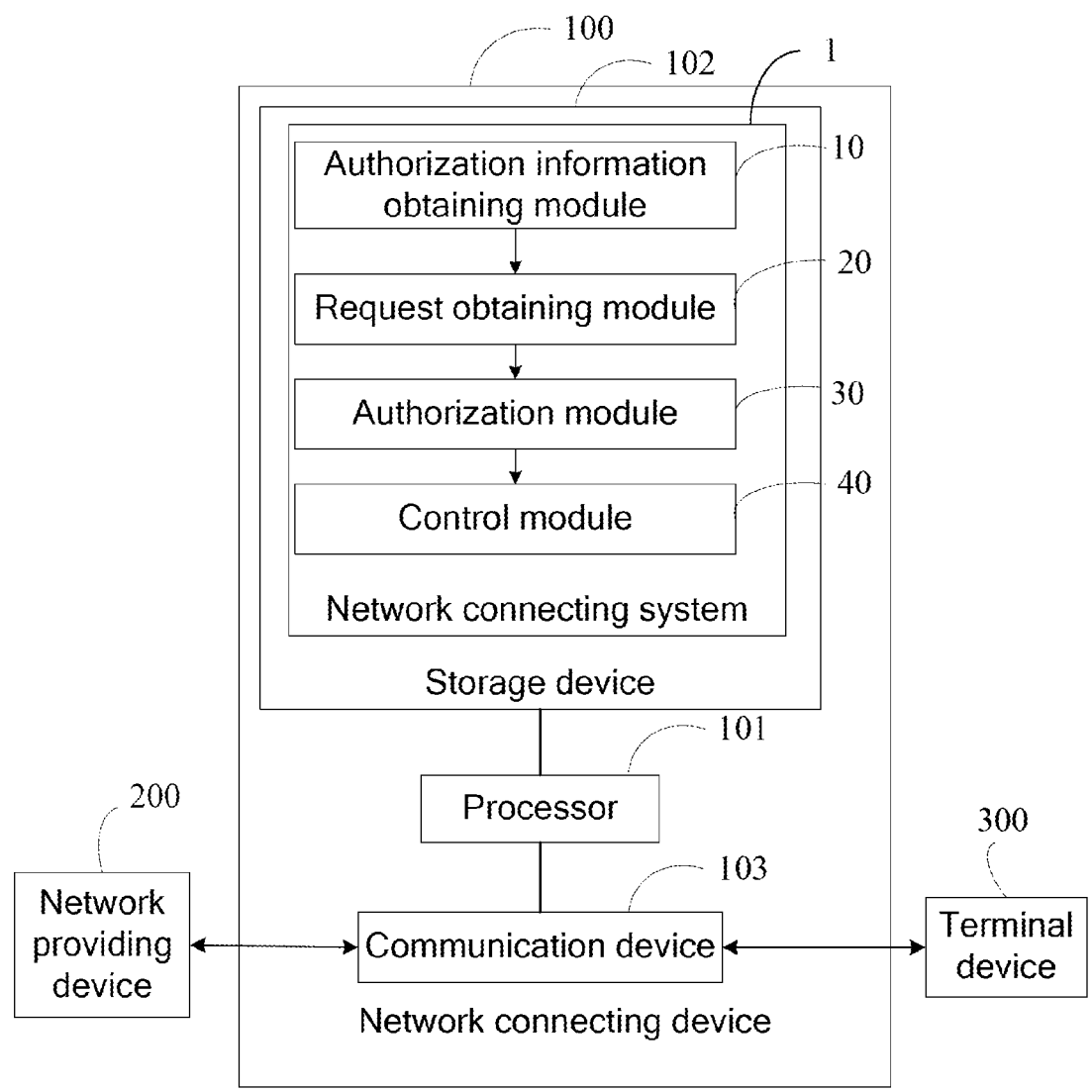
FIG. 1 is a block diagram illustrating an example embodiment of a network connecting device running a network connecting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein, However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Several definitions that apply throughout disclosure will now be presented. The term "module" refers to logic embodied in computing or firmware, or to a collection of software instruction, written in a programming language, such as Java, C, or assembly. One or more software instruction in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series and the like.

FIG. 1 illustrates a block diagram of a network connecting device 100 running a network connecting system 1. The network connecting device 100 includes a processor 101, a storage device 102, and a communication device 103. In one embodiment, the processor 101 can be a central processing unit (CPU), a microprocessor, or other data processor chip that performs functions of the network connecting device 100. The storage device 102 can be an internal storage system, such as a flash memory, a random access memory (RAM) for temporary storing of information, and/or a read-only memory (ROM) for permanently storing information. The storage device 102 can also be an external storage system, such as a hard disk, a storage card, or a data storage medium. In at least one embodiment, the storage device 102 can include two or more storage devices such that one storage device is a memory and the other storage device is a hard drive. Additionally, one or more of the storage devices can be located externally relative to the network connecting device 100. The network connecting device 100 communicates with a network providing device 200 and a terminal device 300 via the communication device 103.

The network providing device 200 can provide an authorization information to permit the terminal device 300 to share a network in response to a user input. In this embodiment, the network shared by the network providing device 200 is Wi-Fi network. The terminal device 300 can generate a request for sharing the network provided by the network providing device 200 in response to the user input. In the embodiment, the network providing device 200 can be located at a home of the user, and can be a router. The terminal device 300 can be a mobile phone, a tablet computer, a portable computer, for example.

The network connecting device 100 can obtain the authorization information provided by the network providing device 200. The network connecting device 100 further can connect the terminal device 300 to the network shared by the network providing device 200 according to the authorization information when receiving the request for sharing the network from the terminal device 300. In this embodiment, the terminal device 300 communicates with the network connecting device 100 via a General Packet Radio Service (GPRS) network or the 3rd Generation Telecommunication (3G) network. The network providing device 200 communicates with the network connecting device 100 via Wi-Fi.

The network connecting system 1 running in the network connecting device 100 is stored in the storage device 102. The network connecting system 1 can include a number of modules, which are collection of software instructions executed by the processor 101.

In at least one embodiment, the network connecting system 1 can include an authorization information obtaining module 10, a request obtaining module 20, an authorization module 30, and a control module 40.

The authorization information obtaining module 10 can obtain authorization information provided by the network providing device 200 when determining that the network providing device 200 providing the authorization information, and store the obtained authorization information to the storage device 102. The authorization information can include a Service Set Identifier (SSID) and a network key of the network provided by the network providing device 200. The SSID is configured to identify a name of the network provided/shared by the network providing device 200. The network key is a password for accessing the network provided by the network providing device 200. In at least one embodiment, the authorization information further can include a maximum bandwidth provided by the network providing device 200 and a time period that the network providing device 200 providing the network. The network providing device 200 can set the provided maximum bandwidth and the time period in response to user input. For example, if the user is at work from 8:00 a.m. to 15:00 p.m., thus the user can set the network providing device 200 to provide the network at home from 8:00 a.m. to 15:00 p.m.

In at least one embodiment, the authorization information further can include a user name of the network providing device 200 providing the network, and a location information of the network providing device 200 providing the network. The authorization information obtaining module 10 can obtain a number of authorization information from different network providing devices 200 and stores the authorization information of different network providing devices 200 to the storage device 102. The request obtaining module 20 further can obtain a number of request for sharing the network from different terminal devices 300.

The request obtaining module 20 can obtain a request for sharing network from the terminal device 300. In a first embodiment, the request can include a location information of the terminal device 300. In a second embodiment, the request can include a user name of a target network providing device 200 that the terminal device 300 intends to share the network.

The authorization module 30 can select an authorization information from the storage device 102 when the request obtaining module 20 receiving the request for sharing the network from the terminal device 300. The authorization module 30 then determines the network providing device 200 corresponding to the selected authorization information and connects the terminal device 300 to the network provided by the determined network providing device 200 according to the selected authorization information. In the embodiment, the authorization module 30 obtains the user name of the network providing device 200 included in the selected authorization information, and then determines network providing device 200 corresponding to the selected authorization information according to the user name of the network providing device 200 included in the selected authorization information. In this embodiment, the authorization information of each network providing device 200 is just stored in the storage device 102 of the network connecting device 100, the terminal device 300 is connected to the network provided by the network connecting device 100, but the terminal device 300 cannot get the authorization information of the network providing device 200.

In detail, in this embodiment, the authorization module 30 randomly selects one authorization information from the storage device 102 when the request obtaining module 20 receives the request for sharing the network. In a second embodiment, the authorization module 30 determines whether the request for sharing the network includes a location information of the terminal device 300 when the request obtaining module 20 receives the request from the terminal device 300, and selects an authorization information having a same location as that of the terminal device 300 if determining that the request includes the location information. In a third embodiment, the authorization module 30 determines whether the request includes a user name of a target network providing device 200, and selects the authorization information having the user name of the target network providing device 200 from the storage device 102. If the authorization module 30 determines that there is no authorization information having the user name or the location information included in the request, the authorization module 30 randomly selects one authorization information from the storage device 102.

The control module 40 can be configured to control a bandwidth and a time period of a current network that the terminal device 300 is sharing, according to the authorization information of the network providing device 200 which provides the current network. The control module 40 can further be configured to control the authorization module 30 to switch the terminal device 300 to connect to another network provided by another network providing device 200 if the control module 40 determines that the terminal device 300 cannot be connected to the current network anymore or the bandwidth of the current shared network cannot satisfy the terminal device 300.

Figure 2:
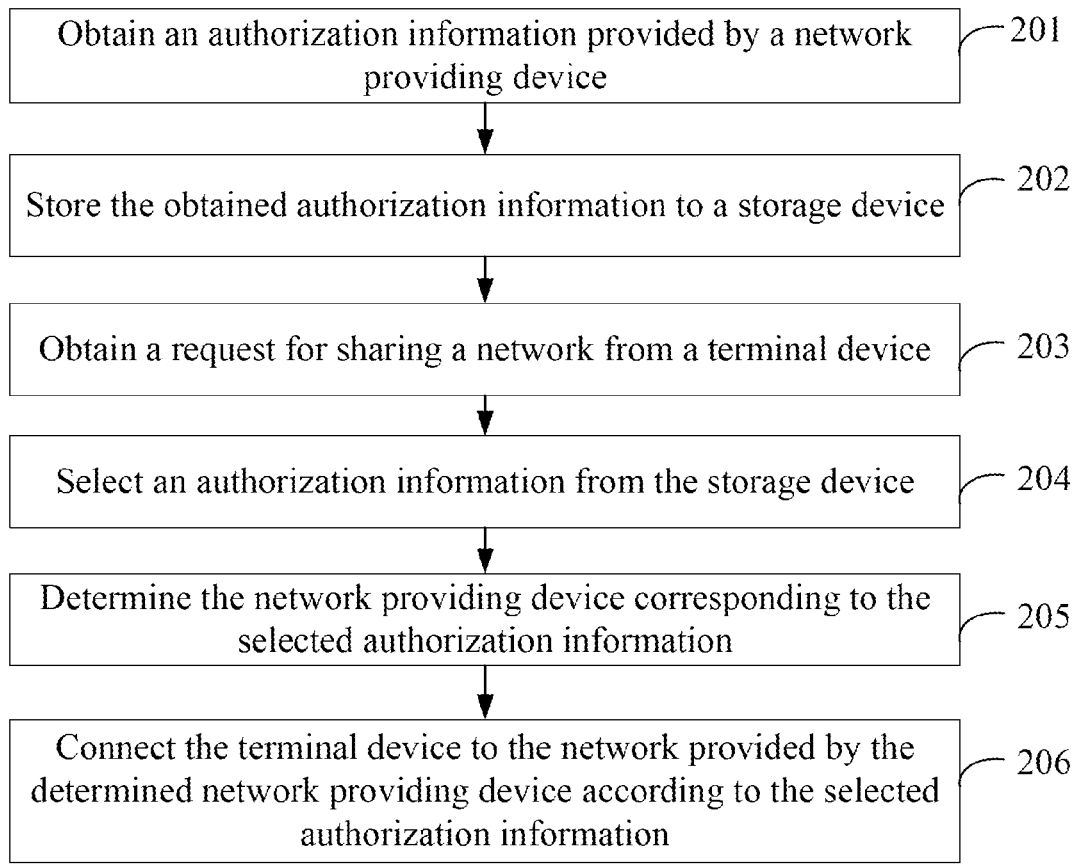
FIG. 2 is a flowchart of an example embodiment of a network connecting method.

FIG. 2 illustrates an embodiment of a network connecting method. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Additionally, the illustrated order of blocks is by example only and the order of the blocks can be changed. The example method can begin at block 201.

At block 201, an authorization information obtaining module obtains an authorization information provided by a network providing device when the authorization determines that the network providing device providing the authorization information. The authorization information can include a user name of the network providing device providing the network, and a Service Set Identifier (SSID) and a network key of network provided by the network providing device. The authorization information further can include a maximum bandwidth provided by the network providing device and a time period that the network providing device providing the network.

At block 202, the authorization information obtaining module 10 stores the obtained authorization information to a storage device.

At block 203, a request obtaining module obtains a request for sharing network from a terminal device when the request obtaining module determines that the terminal device sending the request for sharing network.

At block 204, an authorization module selects an authorization information from the storage device when the request obtaining module receiving the request from the terminal device.

At block 205, the authorization module determines the network providing device corresponding to the selected authorization information.

At block 206, the authorization module connects the terminal device to the network provided by the determined network providing device according to the selected authorization information.

In this embodiment, the method can further include controlling a bandwidth and a time period of a current network that the terminal device is sharing, according to the authorization information of the network providing device which provides the current network. The control module further controls the authorization module to switch the terminal device to connect another network provided by another network providing device if the control module determines that the terminal device cannot be connected to the current network anymore or the bandwidth of the current shared network cannot satisfy the terminal device.

The embodiments shown and described above are only examples. Many further details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A network connecting device comprising:
a communication device, the communication device communicating with at least one network providing device and at least one terminal device, the at least one network providing device capable of providing an authorization information to permit the at least one terminal device to share at least one network provided by the at least one network providing device, the at least one terminal device capable of generating a request for sharing the at least one network provided by one of the at least one network providing device;
a storage device;
a processor coupled to the communication device and the storage device;
an authorization information obtaining module, stored in the storage device, comprising instruction to cause the processor to obtain the authorization information provided by the at least one network providing device and store the obtained authorization information to the storage device, wherein the authorization information comprises a service set identifier (SSID) and a network key of the at least one network provided by the at least one network providing device, the SSID is configured to identify a name of the at least one network provided by the at least one network providing device, the network key is a password for accessing the at least one network provided by the at least one network providing device;
a request obtaining module, stored in the storage device, comprising instructions to cause the processor to obtain the request for sharing the at least one network from the at least one terminal device; and
an authorization module, stored in the storage device, comprising instructions to cause the processor to select an authorization information from the storage device when the request obtaining module receives the request from the at least one terminal device, and connect the at least one terminal device to the at least one shared network provided by one of the at least one network providing device corresponding to the selected authorization information according to the selected authorization information;
wherein the authorization information further comprises location information of the at least one network providing device, the request for sharing network comprises location information of the at least one terminal device, the authorization module causes the processor to determine whether an obtained request comprises a location information when receiving the request from the at least one terminal device, and select the authorization information having a same location as that of the at least one terminal device if determining that the request includes the location information.

2. A network connecting system applied in a network connecting device, the network connecting device comprising a storage device, a processor, and a communication device, the communication device communicating with at least one network providing device and at least one terminal device, the at least one network providing device capable of providing an authorization information to permit the at least one terminal device to share at least one network provided by the at least one network providing device, the at least one terminal device capable of generating a request for sharing the at least one network provided by one of the at least one network providing device, the system comprising:
an authorization information obtaining module, stored in the storage device, comprising instruction to cause the processor to obtain the authorization information provided by the at least one network providing device and store the obtained authorization information to the storage device, wherein the authorization information comprises a service set identifier (SSID) and a network key of the at least one network provided by the at least one network providing device, the SSID is configured to identify a name of the at least one network provided by the at least one network providing device, the network key is a password for accessing the at least one network provided by the at least one network providing device;
a request obtaining module, stored in the storage device, comprising instructions to cause the processor to obtain the request for sharing the at least one network from the at least one terminal device; and
an authorization module, stored in the storage device, comprising instructions to cause the processor to select an authorization information from the storage device when the request obtaining module receives the request from the at least one terminal device, and connect the at least one terminal device to the at least one shared network provided by one of the at least one network providing device corresponding to the selected authorization information according to the selected authorization information;
wherein the authorization information further comprises location information of the network providing device, the request for sharing network comprises location information of the at least one terminal device, the authorization module causes the processor to determine whether an obtained request comprises a location information when receiving the request from the at least one terminal device, and select the authorization information having a same location as that of the at least one terminal device if determining that the request includes the location information.

3. A network connecting method applied in a network connecting device, the network connecting device comprising a storage device, a processor, and a communication device, the network connecting device communicating with at least one network providing device and at least one terminal device via the communication device, the at least one network providing device capable of providing an authorization information to permit the at least one terminal device to share a network provided by the at least one network providing device, the at least one terminal device capable of generating a request for sharing the network provided by one of the at least one network providing device, the method comprising:

obtaining the authorization information provided by the at least one network providing device and storing the obtained authorization information to the storage device by the processor, wherein the authorization information comprises a service set identifier (SSID) and a network key of the network provided the at least one network providing device, the SSID is configured to identify a name of the network provided by the at least one network providing device, the network key is a password for accessing the network provided by the at least one network providing device;

obtaining the request for sharing the network from the at least one terminal device by the processor; and selecting one authorization information from the storage device when the request obtaining module receives the request from the at least one terminal device, and connecting the at least one terminal device to the network provided by one of the at least one network providing device corresponding to the selected authorization information according to the selected authorization information;

wherein the authorization information further comprises location information of the at least one network providing device, the request for sharing network comprises location information of the at least one terminal device, the method further comprises determining whether an obtained request comprises a location information when receiving the request from the at least one terminal device, and selecting the authorization information having a same location as that of the at least one terminal device if determining that the request includes the location information.

* * * * *